United States Patent [19]

Sahm et al.

[11] Patent Number: 4,705,455
[45] Date of Patent: Nov. 10, 1987

[54] CONVERGENT-DIVERGENT FILM COOLANT PASSAGE

[75] Inventors: Michael K. Sahm, Ellington; Robert Milano, East Hartford, both of Conn.

[73] Assignee: United Technologies Corporation, Hartford, Conn.

[21] Appl. No.: 812,092

[22] Filed: Dec. 23, 1985

[51] Int. Cl.[4] .............................................. F01D 5/18
[52] U.S. Cl. ................................... 416/97 R; 415/115
[58] Field of Search .................... 416/97 R, 97 A, 95; 415/115; 60/757, 752, 755, 756, 758–760

[56] References Cited

U.S. PATENT DOCUMENTS

| | | | |
|---|---|---|---|
| 1,857,509 | 5/1932 | Holmstrom . | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Piot et al. | 219/69 |
| 3,303,645 | 2/1967 | Ishibashi | 60/39.65 |
| 3,447,318 | 6/1969 | Caruel et al. | 60/39.65 |
| 3,515,499 | 6/1970 | Beer et al. | 416/97 A X |
| 3,527,543 | 9/1970 | Howald | 416/97 R X |
| 3,594,536 | 7/1971 | Holroyd | 219/69 |
| 3,619,076 | 11/1971 | Kydd | 416/90 |
| 3,635,586 | 1/1972 | Keat et al. | 416/97 |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 R |
| 3,830,450 | 8/1974 | Williams et al. | 244/42 |
| 3,844,677 | 10/1974 | Evans | 416/84 |
| 3,844,679 | 10/1974 | Grondahl et al. | 416/97 R |
| 3,889,903 | 6/1975 | Hilby | 244/42 |
| 3,891,348 | 6/1975 | Auxier | 416/97 R |
| 3,915,106 | 10/1975 | De Witt | 114/66.5 |
| 3,995,422 | 12/1976 | Stamm | 60/39.66 |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,214,722 | 7/1980 | Tamura | 244/208 |
| 4,221,539 | 9/1980 | Corrigan | 416/97 A |
| 4,229,140 | 10/1980 | Scott | 415/115 X |
| 4,267,698 | 5/1981 | Hartmann et al. | 60/756 |
| 4,303,374 | 12/1981 | Braddy | 416/97 R |
| 4,314,442 | 2/1982 | Rice | 60/39.05 |
| 4,384,823 | 5/1983 | Graham | 416/1 |
| 4,485,630 | 12/1984 | Kenworthy | 60/757 |
| 4,565,490 | 1/1986 | Rice | 415/115 X |

FOREIGN PATENT DOCUMENTS

| | | | |
|---|---|---|---|
| 2840103 | 3/1979 | Fed. Rep. of Germany | 415/115 |
| 665155 | 1/1952 | United Kingdom . | |
| 825967 | 12/1959 | United Kingdom | 416/97 R |

OTHER PUBLICATIONS

Flight and Aircraft Engineer, No. 2460, vol. 69, 3-1-6-56 pp. 292–295.
Advances in Heat Transfer by Richard J. Goldstein, vol. 7, Academic Press (N.Y. 1971), the Monograph Film Cooling, pp. 321–379.
NASA Techical Paper 1546 Influence of Coolant Tube Curvature on Film Cooling Effectiveness as Detected by Infrared Imagery by S. Stephen Papell et al, 1979.

Primary Examiner—Everette A. Powell, Jr.
Attorney, Agent, or Firm—Stephen E. Revis

[57] ABSTRACT

A coolant passage through a wall to be cooled, such as the wall of a hollow airfoil, is shaped and oriented to eject coolant fluid therefrom within the boundary layer of hot gases flowing over the surface to film cool the wall downstream of the outlet. The passage includes a metering portion near its inlet, followed by a diffusing portion and nozzle portion. Th nozzle portion, adjacent the outlet, simultaneously diverges and converges in mutually perpendicular directions to produce a more uniform coolant velocity profile, which results in increased coolant area coverage and improved cooling effectiveness.

14 Claims, 13 Drawing Figures

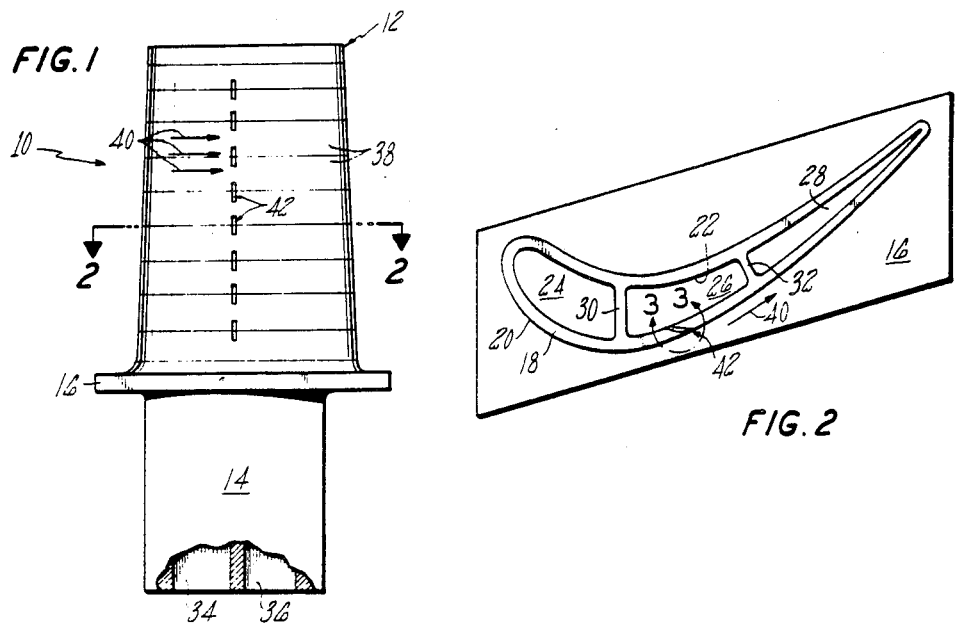
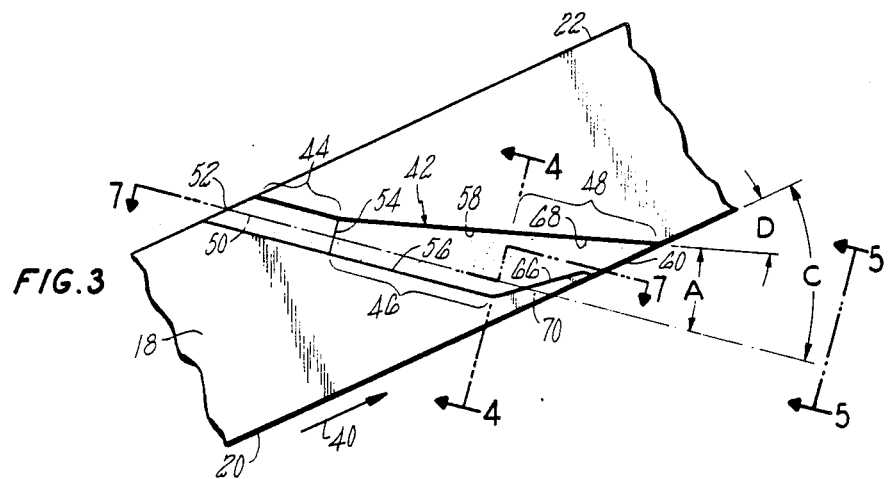
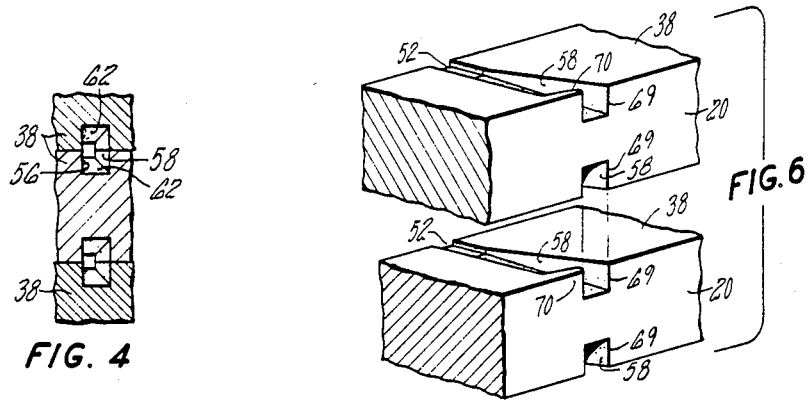

CONVERGENT-DIVERGENT FILM COOLANT PASSAGE

DESCRIPTION

TECHNICAL FIELD

This invention relates to film cooling, and more particularly to film cooled airfoils.

BACKGROUND ART

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance x downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Japanese patent No. 55-114806 shows, in its FIGS. 2 and 3, a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

U.S. Pat. No. 4,384,823 describes a hollow airfoil having curved coolant passages of constant circular cross section through its wall for injecting a film of coolant over the surface of an airfoil.

Other publications relating to film cooling the external surface of an airfoil are: U.S. Pat. Nos. 2,149,510; 2,220,420; 2,489,683; and "Flight and Aircraft Engineer" No. 2460, Vol. 69, 3/16/56, pp. 292-295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also produce exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 1971) includes a monograph titled *Film Cooling*, by Richard J. Goldstein, at pp. 321-379, which presents a survey of the art of film cooling. The survey shows elongated slots of different shapes extending entirely through the wall being cooled, and also passages of circular cross section extending through the wall.

U.S. Pat. Nos. 2,477,583; 3,303,645; 3,447,318; 3,995,422; and 4,267,698 and British Patent Specification No. 665,155 published Jan. 16, 1952 describe combustion chambers having coolant passage means within their walls for bringing coolant into the chamber as a film on the inside surface thereof.

DISCLOSURE OF INVENTION

One object of the present invention is improved means for cooling a wall over which a hot gas stream is flowing.

Another object of the present invention is a coolant passage through the wall of a hollow airfoil, which passage provides a uniform film of coolant over the surface of the airfoil downstream of the passage outlet.

Yet another object of the present invention is a coolant passage through the wall of a hollow airfoil which is able to spread a small amount of coolant uniformly as a wide film over a large area of the external surface of the airfoil downstream of the passage outlet.

According to the present invention, a wall to be cooled is adapted to have a supply of coolant fluid on a first side thereof and a hot gas flowing on a second side thereof in a downstream direction tangent to the external surface and perpendicular to a longitudinal direction in the plane of the external surface, wherein the wall has a coolant passage therethrough which communicates with the supply of coolant fluid and includes, in series flow relation, a metering portion to control the flow rate of coolant fluid through the passage, a diffusing portion increasing in cross-sectional flow area toward the passage outlet at the external surface of the wall, and a nozzle portion which simultaneously diverges in the longitudinal direction and converges toward the passage outlet in a direction perpendicular longitudinal direction, wherein the passage is oriented to direct coolant fluid therefrom in the generally downstream direction at a shallow angle to the external surface.

Prior art coolant passages, such as passages through the wall of a hollow airfoil for forming a film of coolant on the external surface downstream of the passage outlet, are generally of two types. The first type has a constant cross section throughout its length. The second type has a metering section, usually near its inlet, and thereafter increases in cross-sectional area to the outlet at the hot surface. If it is assumed the downstream direction is tangent to the hot surface, and the longitudinal direction is perpendicular to the downstream direction and lies in the plane of the hot surface, then the wall surfaces of the second type of prior art passages typically diverge in both the longitudinal direction and in a plane perpendicular to the longitudinal direction. In such prior art configurations the velocity profile of the coolant fluid as it exits the passage is not uniform along the longitudinal length of the outlet. Rather, there is a maximum velocity near the center of the passage outlet which tapers off toward the longitudinal extremities of the outlet. Since fluid velocity is directly proportional to the mass flow rate (for substantially uniform temperatures throughout the fluid at the outlet), the mass of coolant exiting the passage is not uniformly distributed over the longitudinal extent of the passage outlet.

The wall surfaces of the passages of the present invention diverge in a longitudinal plane to the outlet as in passages of the prior art. However, the wall surfaces simultaneously converge toward the outlet in a plane perpendicular to the longitudinal direction, which tends to move coolant fluid toward the longitudinal extremities of the passage as the fluid moves toward the outlet. The result is a more uniform mass flow over the longitudinal extent of the outlet. It has also been observed in flow visualization tests that, with the present invention, the coolant fluid spreads out beyond the longitudinal length of the passage upon leaving the outlet, thereby providing a further increase in surface area coverage. Additionally, it is believed that as the fluid exits the passage its component of velocity perpendicular to the external surface is reduced, while its velocity component in the downstream direction is increased. As a result of these several effects, the fluid, upon leaving the passage, remains closer to the external surface.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a hollow turbine blade, partly broken away, which incorporates coolant passages configured in accordance with the present invention.

FIG. 2 is a sectional view taken along the line 2—2 of FIG. 1.

FIG. 3 is an enlarged view of the area designated 3—3 in FIG. 2.

FIG. 4 is a sectional view taken along the line 4—4 of FIG. 3.

FIG. 6 is an exploded, perspective view of a portion of two adjacent wafers of the airfoil of FIG. 1 illustrating the coolant passages of the present invention.

BEST MODE FOR CARRYING OUT THE INVENTION

Figure 5:
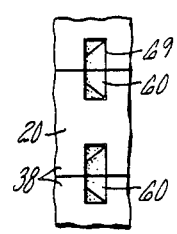
FIG. 5 is a view taken generally in the direction 5—5 of FIG. 3.

As an exemplary embodiment of the present invention, consider the turbine blade of FIG. 1 generally represented by the reference numeral 10. With reference to FIGS. 1 and 2, the blade 10 comprises a hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending comapartments 24, 26, 28, respectively, by longitudinally extending ribs 30, 32. The passages 34, 36 within the root 14 communicate with the compartments 24, 26, and 28. When the blade 10 is operated in its intended environment, such as in the turbine section of a gas turbine engine, pressurized coolant from a suitable source, such as compressor bleed air, is fed into the passages 34, 36 and pressurizes the compartments 24, 26, and 28.

In this embodiment the airfoil 12 is formed of a plurality of cordwise extending wafers 38, although such is not a requirement of the present invention. Each wafer has an external airfoil shape, and is formed with holes, notches, channels, and the like such that when the wafers are stacked and bonded to each other they form the airfoil 12 with all the desired channels and cavities therewithin. Blades and airfoils made from wafers of this type are well known in the art. For example, they are described in U.S. Pat. No. 3,515,499 Beer et al and commonly owned U.S. Pat. No. 3,301,526 Chamberlain, both of which are incorporated herein by reference.

Throughout the drawing the arrows 40 represent the direction of flow (i.e., streamlines) of hot gases over the surface of the airfoil. For purposes of the description of the present invention, the direction of flow of hot gases over either the pressure or suction side surfaces of the airfoil shall be considered the downstream direction. Thus, at any point on the suction or pressure side surface of the airfoil, the downstream direction is tangent to the surface of the airfoil; and, except perhaps close to the airfoil tip or the airfoil base near the platform 16 where atypical currents are generated, the downstream direction is substantially perpendicular to the spanwise direction of the airfoil.

In accordance with one embodiment of the present invention the airfoil 12 includes a longitudinally extending row of spaced apart coolant passages 42 through the suction side portion of the airfoil wall 18. For purposes of clarity and simplicity these are the only coolant passages shown; however, an actual hollow, film cooled turbine airfoil would include several rows of coolant passages through both the suction and pressure side walls, as well as through the leading and trailing edges. The passages could be configured in accordance with the teachings of the present invention or may have other shapes well known in the art. Also, the airfoil could be a stationary vane as well as part of a rotating blade. Thus, the airfoil shown in the drawing is intended to be illustrative only and not limiting.

As best shown in FIGS. 3-7, each passage 42 comprises, in series flow relation, a metering portion 44, a diffusing portion 46, and a nozzle portion 48. The metering portion 44 is straight and of constant cross section perpendicular to a central axis 50 thereof. The axis 50 passes through the geometric center of the cross section. Although in this embodiment the axis also lies in a plane perpendicular to the longitudinal direction, it may be tilted longitudinally such as are the passages shown in U.S. Pat. No. 3,527,543 (FIGS. 6-8) and in commonly owned patent application Ser. No. 812,099 titled Cross-Flow Film Cooling Passages by James Vehr, filed on even date herewith. Also in this embodiment the metering portion has a substantially rectangular cross section which communicates with the coolant compartment 26 via an inlet 52 to the passage 42 at the inner surface 22 of the wall 18. The metering portion 44 includes the minimum cross-sectional flow area of the passage 42 and controls the rate of fluid flow through the passage. Its length should be at least long enough to clearly define the desired metering area of the passage. The cross-sectional shape of the metering area is not considered critical to the present invention.

The outlet of the metering portion 44 is coincident with the inlet 54 to the diffusing portion 46. The diffusing portion 46 is also substantially rectangular in cross section perpendicular to the central axis 52. It includes a substantially flat longitudinally extending upstream wall surface 56 which faces downstream, and a substantially flat longitudinally extending downstream surface 58 which faces generally upstream. The upstream surface 56 is parallel to the central axis 52 along the entire length of the surface. The downstream surface 58 diverges from the central axis 52 and from the upstream surface 56 toward the outlet 60 of the passage 44. The angle of divergence is herein designated by the letter A and is preferably between 5° and 10°.

Figure 7:
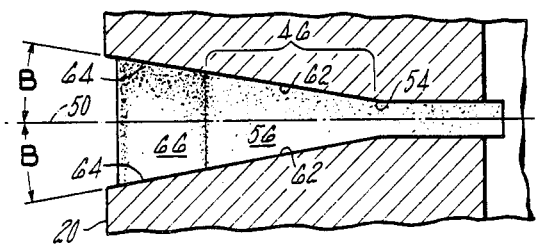
FIG. 7 is an offset sectional view taken generally along the line 7—7 of FIG. 3.

As best shown in FIG. 7, the diffusing portion 46 includes a pair of spaced apart, substantially flat end surfaces 62 which diverge from the central axis 50 and from each other in the longitudinal direction toward the outlet 60. In this embodiment the surfaces 62 diverge from the diffusing portion inlet 54 until they intersect the external surface 20 of the airfoil. The letter B is used to designate the angle of divergence of each surface 62 from the central axis 50.

The nozzle portion 48 of the passage 42 includes spaced apart, facing end surfaces 64 which diverge from each other in the longitudinal direction along their entire length to the external surface 20. In this embodiment the surfaces 64 are coextensive and coplanar with corresponding surfaces 62. As best shown in FIG. 3, the nozzle portion 48 also includes longitudinally extending, spaced apart, facing, upstream and downstream surfaces 66, 68, respectively. The downstream surface 68 is coplanar and coextensive with the downstream surface 58 of the diffusing portion and extends from the diffusing portion to the external surface 20, defining a longitudinally extending downstream edge 69 (FIG. 5) of the passage outlet 60. The upstream surface 66 converges toward the surface 68 from the diffusing portion 30 substantially to the outlet 60 in a direction perpendicular to the longitudinal direction (in the plane of the paper in FIG. 3). Thus, the nozzle portion 48 converges toward the outlet 60 in a direction perpendicular to the longitudinal direction while simultaneously diverging toward the outlet 60 in the longitudinal direction. The coolant fluid flowing through the passage is redirected by a surface 66 toward the surface 68 while simultaneously being forced to spread out longitudinally as it moves toward the outlet 60. Its component of velocity in a direction perpendicular to the external surface 20 is thereby reduced while its component of velocity in the downstream direction 40 is increased. The mass of fluid thus becomes more uniformly distributed over the longitudinal extent of the outlet 60 as it leaves the passage. The smaller component of velocity perpendicular to the surface 20 helps the fluid stay within the boundary layer as it moves downstream of the outlet 60.

In this embodiment the surface 66 is the inside surface of a lip 70. The surface 66 preferably extends far enough from the surface 56 toward the surface 48 to block the line of sight of the metering portion 44 along the axis 50. This assures that none of the fluid leaving the metering portion 44 leaves the passage 42 along a direct path parallel to the axis 50. This further reduces the average velocity of the coolant fluid in a direction perpendicular to the surface 20. It is believed that some of the advantages of the present invention may also be obtained even though the line of sight is not completely blocked.

Preferably the angle C formed between the central axis 50 and the plane of the surface 20 (which is the same as the angle between the central axis 50 and the downstream direction 40) is a shallow angle no greater than about 40° and most preferably 30° or less. Since the angle A is preferably at least about 5°, the surface 66 preferably intersects the surface 20 at an angle D of no greater than about 35°. In general, the wall surfaces of the passage should be oriented to direct the fluid from the outlet in the downstream direction at a shallow angle, relative to the external surface, of no greater than about 40°.

As shown in the enlarged, perspective, exploded view of FIG. 6, opposing halves of each passage 42 are formed in the abutting, bonded together surfaces of adjacent wafers 38 such that when the wafers are bonded together the corresponding halves of the passage 42 are aligned to define the complete coolant passage 42. It should be apparent, however, that the airfoil 12 need not be made from wafers. It could be cast as a single piece or could, for example, be made from two longitudinally extending halves, one half being the suction side of the airfoil and the other half being the pressure side. The passages 42 could be either cast or machined (such as by electrodischarge machining) into the airfoil wall.

Figure 8:
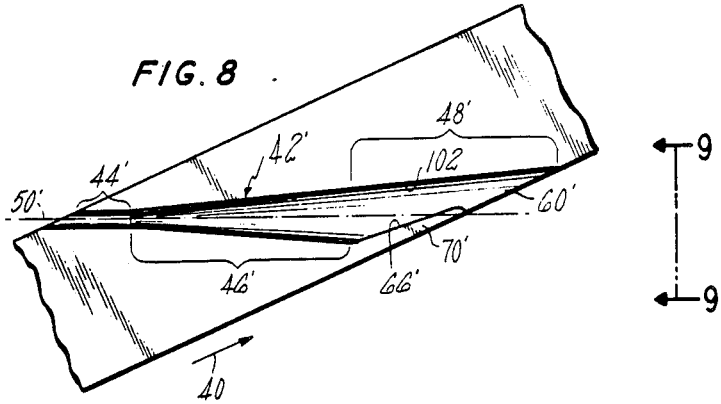
FIG. 8 is a view analogous to the view shown in FIG. 3 showing an alternate configuration for the coolant passage of the present invention.
Figure 9:
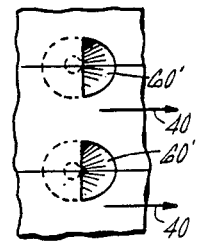
FIG. 9 is a view taken generally in the direction 9—9 of FIG. 8.

FIGS. 8 and 9 are views corresponding, respectively, to FIGS. 3 and 5, which show an alternate configuration for the passages 42. Elements of FIGS. 8 and 9 which are analogous to elements of FIGS. 3 and 5 are given the same but primed reference numerals. In the embodiment of FIGS. 8 and 9 the passage 42' comprises a cylindrical metering portion 44' followed by a conical diffusing portion 46'. The central axis 50' is the axis of the cone. The nozzle portion 48' is formed by a lip 70' which blocks a substantial portion of the end of the cone and creates an outlet 60' having the shape of a segment of an ellipse. The flat inner surface 66' of the lip 70' converges toward the upstream facing curved surface 102 of the nozzle portion 48' toward the outlet 60' in a plane perpendicular to the longitudinal direction; while at the same time the passage continues to diverge in the longitudinal direction.

Figure 13:
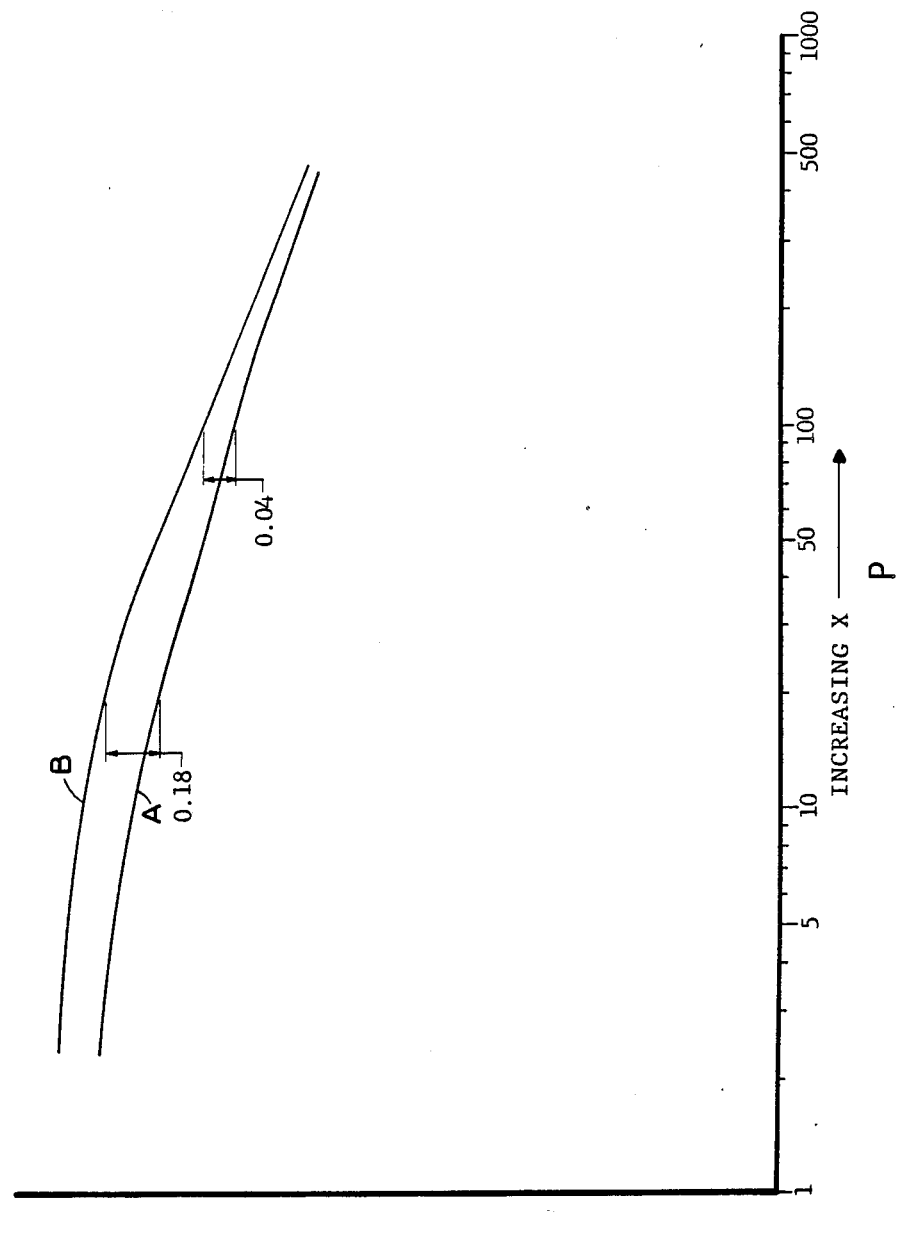
FIG. 13 is a graph which may be used to compare film cooling effectiveness of a coolant passage configuration of the present invention to that of the baseline configuration of FIGS. 10-12.

In FIG. 13 the horizontal axis is a dimensionless parameter P whose value is the ratio of the distance x from the outlet of the cooling passage (in the direction of the mainstream gas flow over the outlet—i.e., the downstream direction) to a number directly related to the mass flow rate of cooling air exiting the passage. The vertical axis is a measure of the film cooling effectiveness E (as hereinabove defined) measured at a distance x downstream of the passage outlet. The maximum possible cooling effectiveness is 1.0. Because P is directly related to distance from the passage outlet, and since the distance downstream of the outlet is the only variable in these tests, P may be considered as a measure of distance downstream of the passage outlet.

Figure 10:
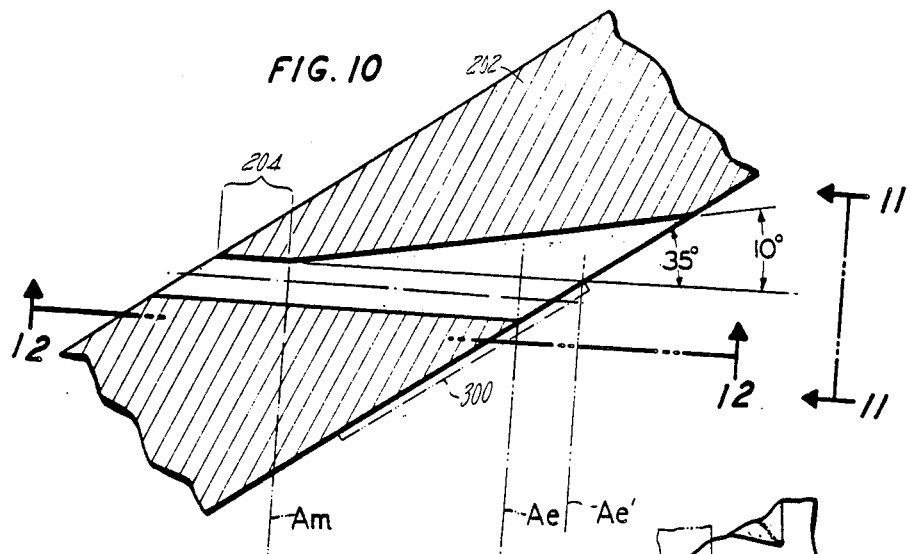
FIGS. 10-12 show a baseline coolant passage configuration against which comparisons of the present invention may be made.
Figure 11:
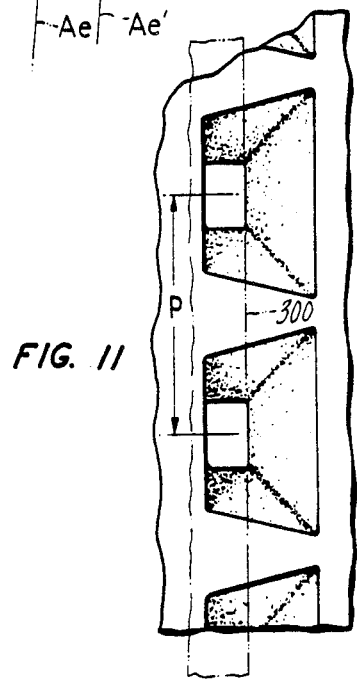
Figure 12:
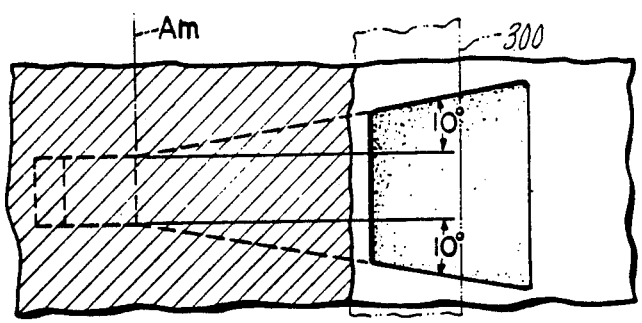

The curve labeled A is for a row of baseline coolant passages 200 through a test plate 202 such as shown in FIGS. 10-12. The baseline configuration is used for comparison purposes and is similar to the coolant passages described in Sidenstick, U.S. Pat. No. 4,197,443, except the divergence angles are 10°. The area ratio $A_e/A_m$ for each passage was 3.0, where $A_e$ (exit area) is the cross-sectional area of the passage outlet measured in the plane labeled $A_e$ in FIG. 10, and where $A_m$ (metering area) is the cross-sectional area of the metering section 204 (FIG. 9) as measured in the plane labeled section 204 (FIG. 9) as measured in the plane labeled $A_m$. The pitch to diameter ratio, p/d, was 4.0, wherein p (FIG. 11) is the distance between the centers of adjacent metering sections 200, and d is the effective diameter of the metering section, which is the diameter of a circle having the cross-sectional area $A_m$.

The curve B is for a coolant passage according to the present invention. In the present instance such passage was formed by applying a length of tape over the upstream portions of the test piece baseline passages described above. This tape is shown in phantom in FIGS. 10-12 and is labeled with the reference numeral 300. The tape formed the surface 68 in FIG. 3. The exit area $A'_e$ was measured in a plane $A'_e$ perpendicular to the central axis of the metering portion 204 and located at the downstream end of the tape 300. The new area ratio $A'_e/A_m$ was 2; and the pitch to diamter ratio, p/d, remained the same at 4.0. All other conditions of the test were identical to those of the test of the baseline configuration.

The improvement in film cooling effectiveness, E provided by the present invention as compared to the baseline shaped holes is significant and can readily be seen in the graph of FIG. 13. For example, at P=20 the baseline shaped holes had a cooling effectiveness about 0.18 less than the test configuration of the present invention. At P=100 the difference was about 0.04. To put this in perspective, assuming a coolant temperature at the passage outlet of 1200° F. and a mainstream gas temperature of 2600° F., a 0.02 increase in cooling effectiveness translates into about a 28° F. decrease in the temperature of the coolant film for the same mass flow rate of coolant.

Although the invention has been shown and described with respect to a preferred embodiment thereof, it should be understood by those skilled in the art that other various changes and omissions in the form and detail of the invention may be made without departing from the spirit and scope thereof.

We claim:

1. A cooled wall having an internal surface defining a portion of a coolant compartment and an external surface adapted to have a hot gas flowing thereover in a downstream direction tangent to said external surface, a coolant passage through said wall having an inlet communicating with said compartment for receiving coolant fluid therefrom and an outlet at said external surface, said passage including, in series flow relation, a metering portion comprising a flow area of constant cross section for metering the flow of coolant fluid through said passage, a diffusing portion having an increasing cross-sectional flow area in the direction toward said outlet, and a nozzle portion terminating at said outlet, said nozzle portion including first wall surface means defining a flow path oriented to direct a flow of fluid therefrom in the generally downstream direction at a shallow angle relative to said external surface, wherein said flow path simultaneously diverges to said outlet in a longitudinal direction perpendicular to the downstream direction, and converges toward and substantially to said outlet in a direction perpendicular to the longitudinal direction, wherein said outlet is elongated in the longitudinal direction.

2. The cooled wall according to claim 1 wherein said first wall surface means comprises a downstream surface which faces generally upstream and intersects said external surface at a shallow angle defining a longitudinally extending downstream edge of said outlet.

3. The cooled wall according to claim 2 wherein said metering portion has a straight central axis passing through the geometric center of its cross-sectional area and extending through the length of said diffusing portion, said first wall surface means of said nozzle portion including a surface located to completely block a line of sight of said metering portion along said central axis.

4. The cooled wall according to claim 1 wherein said wall is the external wall of a hollow airfoil, and the longitudinal direction is the spanwise direction of said airfoil, said wall including a plurality of said passages therethrough spaced apart in a longitudinally extending row.

5. The cooled airfoil wall according to claim 4 wherein said diffusion portion includes second wall surface means defining a flowpath which diverges along its entire length in both the longitudinal direction and in a direction perpendicular to the longitudinal direction.

6. The cooled airfoil wall according to claim 5 wherein said first and second wall surface means each comprise a downstream surface which faces generally upstream, said downstream surfaces being coextensive, extending from said metering portion to said passage outlet and intersecting said external surface of said airfoil at a shallow angle.

7. The cooled airfoil wall according to claim 6 wherein said coextensive downstream surfaces are flat surfaces and define a longitudinally extending downstream edge of said outlet at the intersection of said external surface.

8. The cooled airfoil wall according to claim 7 wherein the cross-sectional area of said passage perpendicular to the direction of flow therethrough is generally rectangular in shape along the length of said diffusing and nozzle portions.

9. The cooled airfoil wall according to claim 4 wherein said first wall surface means comprises a longitudinally extending downstream surface which faces generally upstream and a longitudinally extending upstream surface which is spaced from and faces said downstream surface and converges toward said downstream surface to direct the coolant fluid toward said downstream surface.

10. The cooled airfoil wall according to claim 9 wherein said downstream surface intersects said external surface at an angle no greater than about 40° and defines a longitudinally extending downstream edge of said passage outlet at the intersection of said external surface.

11. The cooled airfoil wall according to claim 10 wherein said metering portion intersects said internal surface of said airfoil wall and includes a central axis passing through the geometric center of said constant cross sectional flow area, and wherein said diffusing portion includes a longitudinally extending first surface facing generally downstream and parallel to said central axis for substantially the length of said diffusing portion and a longitudinally extending second surface facing said first surface and diverging therefrom toward said outlet for the full length of said diffusing portion.

12. The cooled airfoil wall according to claim 11 wherein said diffusing portion second surface is coplanar with said nozzle portion downstream surface.

13. The cooled wall according to claim 1 wherein said first wall surface means comprises a longitudinally extending downstream surface which faces generally upstream and a longitudinally extending upstream surface which is spaced from and faces said downstream surface and converges toward said downstream surface to direct the coolant fluid toward said downstream surface.

14. The cooled wall according to claim 13 wherein said metering portion has a straight central axis passing through the geometric center of its cross-sectional area and extending through the length of said diffusing portion, said upstream surface located to at least partially block a line of sight of said metering portion along said central axis.

* * * * *